Sept. 5, 1961

C. J. ADAMS 2,999,222

ELECTRIC CONTROL UNIT

Filed Oct. 22, 1957

INVENTOR.
CHARLES J. ADAMS
BY Martin Kalikow
ATTORNEY

Patent

2,999,222
ELECTRIC CONTROL UNIT
Charles J. Adams, Bloomington, Ill., assignor to General Electric Company, a corporation of New York
Filed Oct. 22, 1957, Ser. No. 691,775
1 Claim. (Cl. 339—186)

My invention relates to electric control units and more particularly to electric control units utilizing magnetically saturable reactors as a principal control element.

Magnetically saturable reactors have for many years been used in electric control units known as magnetic amplifiers and more recently have found application in contactless type industrial electric controls which have become known as "static" control units. These static control units are well adapted to control the operations of industrial machines and tools when incorporated in circuits designed to perform certain "logic functions." The circuitry and operation of such static control units are described, for example, in co-pending application Serial No. 630,936, Brown, and in application Serial No. 667,945, Morgan, both assigned to the present assignee. These static control units require many more input, output and power supplying connections than conventional movable contact type electromagnetic relays or switches conventionally used to control such industrial machines and tools. The magnetic cores and electrical components of such static control units are also usually more delicate than those of electromagnetic relays or switches. In addition, a greater number of static control units are required to perform a given control function. The circuits of such static control units, however, inherently provide the opportunity for much greater life and reliability.

The commercial success and acceptance of such static control units for industrial applications thus depends upon the availability of a structure which is small and rugged despite the fragility of its internal components and which can be connected into and out of the control circuit quickly and easily despite the great number of connections to be made. Where magnetically saturable reactors are used whose magnetic cores are composed of very thin highly saturable laminations, the problem is aggravated by the necessity to prevent any strains or distortions in these laminations either during manufacture or during their subsequent use since such stresses or distortions might upset the operating characteristics of the unit.

Accordingly, one object of the invention is to provide a small compact and rugged static control unit. Another object is to provide a rugged electric control unit utilizing a fragile and distortable magnetically saturable reactor. A further object of the invention is to provide a static control unit which may be quickly and easily connected into and out of an over-all control circuit. In furtherance of this latter object, it is a specific object of the invention to provide a base for an electric control unit capable of accommodating an unusually large number of closely spaced terminals.

In general, in accord with important features of the invention, an electric control device is provided in which a saturable reactor is suspended on and above a base within an enclosing housing by supporting means lightly contacting the laminations of the reactor thereby to reduce the possibility of introducing strains or distortions in these laminations. The saturable reactor and preferably the other electric components of the device are mounted along axes perpendicular to the base in order to reduce the horizontal cross-sectional dimension of the device and to facilitate wiring connections between these components and terminals in the base. The entire structure is preferably embedded within its housing in a resilient cellular insulating structure which provides protection of the delicate components from shock or rough handling and permits the laminations of the magnetic core to retain their unstressed condition. The base is provided with a plurality of plug-in prong terminals for easy plug-in connection into a corresponding socket of a suitable panel. In accord with a specific feature of the invention, this base contains a central projecting portion which also contains plug-in prong terminals which are insulated by this projecting portion from other closely spaced prong terminals of the unit.

The novel features believed characteristic of the invention are set forth in the appended claim. The invention itself, together with further objects and advantages thereof, may be easily understood by referring to the following description taken in connection with the accompanying drawings in which, FIGURE 1 is a perspective view of a static control unit embodying the invention with the housing and embedding material removed;

Figure 1:
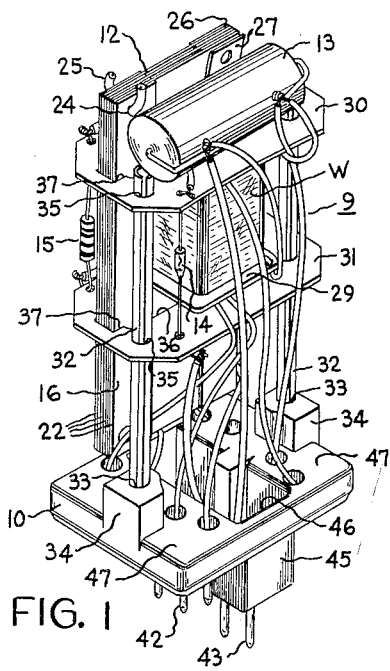
Figure 2:
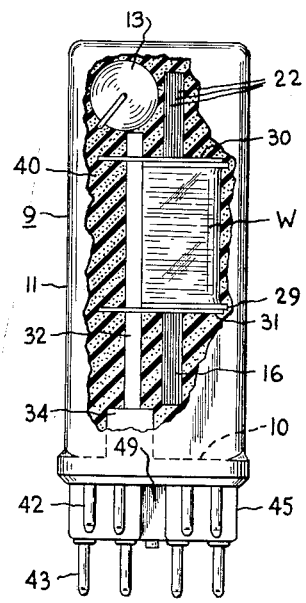
FIGURE 2 is a side view of the control unit of FIGURE 1 with the housing in place but broken away to show the interior of the unit.
Figure 3:
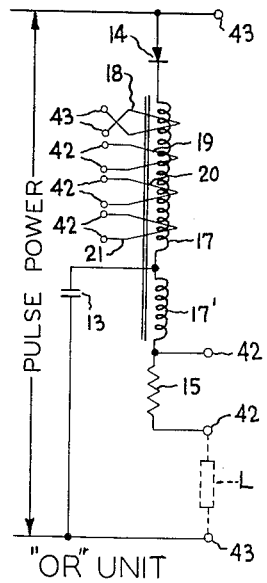
FIGURE 3 is a circuit diagram of the internal connections of the components in the control unit of FIGURE 1.

Referring to FIGURES 1, 2 and 3, a static control unit 9, known as an "or" unit and embodying one form of the invention is shown as comprising an insulating molded base member 10, a housing or casing preferably in the form of a generally rectangular cover can 11 mounted on base member 10 and a plurality of electric current controlling elements mounted on base 10 within cover can 11. These electric control elements include a magnetically saturable reactor 12, a capacitor 13, a unidirectional conducting device or rectifier 14 and a resistor 15. Saturable reactor 12 includes a magnetic core 16 preferably forming a closed rectangular loop, as shown, and a plurality of concentric windings W, including tapped gate winding 17, bias winding 18 and control windings 19, 20 and 21 all wound on a coil form 29 loosely surrounding a leg of core 16. Core 16 is composed of loosely assembled thin, flat, highly saturable preferably U-shaped laminations 22 alternately stacked with the bight of the U at opposite upper and lower ends to form the rectangular core 16 with a central rectangular window 23. The four corners of the laminations preferably have small registering apertures 24 through which small lengths of insulated wires 25 may be inserted and bent in order to aid in holding the laminations loosely together during assembly. At least one corner of the core such as corner 26 is left without such retaining wire, however, to prevent lamination stress and in order that the free end 27 of the outermost lamination may be bent away from the remainder of the core 16 where slight alterations in core saturation characteristics are desired to compensate for non-uniformity of core material.

It will be appreciated that it is desirable to have the horizontal cross-sectional area of control unit 9 smaller than the vertical cross-sectional area in order that a greater number of control units 9 may be mounted alongside one another in a given panel area. In control unit 9 this is achieved by orienting the core 16 of saturable reactor 12 in a plane perpendicular to that of base 10 and mounting all of the remaining electric components with the exception of capacitor 13 along axes perpendicular to base 10 and parallel to core 16. It has been found that this mounting arrangement also facilitates making wire connections from these electric components and from the saturable reactor to terminals located on the base 10.

The mounting means used to provide this orientation comprises a pair of thin non-magnetic plates 30, 31 which may conveniently be paper or fiber located in spaced planes parallel to base 10 and mounted on base 10 by such means as posts 32 inserted within cavities 33 in upstanding bosses 34 of base member 10. Posts 32 extend through tightly fitting spaced holes 35 in plates 30, and 31 whereby these plates are fairly rigidly mounted on the posts 32.

Non-magnetic plates 30 and 31 surround the saturable reactor 12 in planes located above and below the reactor windings W and contain apertures 36 through which the upper and lower portions of core 16 extend. The dimensions of these apertures 36 are greater than the corresponding width and thickness dimensions of the core 16 whereby the core extends as a very loose fit through these plates. In addition, the configuration of these apertures 36 is such that the contact between the plates 30, 31 and the core 16 is light and only over small areas. One desirable configuration is shown in FIGURE 1 as a rectangular aperture having shoulders 37 at the corners which extend toward the opposite sides of the side edges of core 16. The distance between the two corner shoulders 37 confronting each other, however, is made greater than the thickness of the loosely assembled core 16 whereby the core slides as a free fit within plates 30, 31. Rectifier 14 and resistor 15 are preferably also mounted between plates 30 and 31, as shown.

In order to protect the electrical components of the control unit 9 without introducing strains or distortions in the core 16 of reactor 12, both the components and the reactor are embedded or "potted" within can 11 in an insulating, resilient and deformable cellular structure 40. This structure 40 may be formed, for example, from an urethane or polyurethane foam such as produced by the reaction of an organic diisocyanate with a resin in the presence of water and a catalyst, such foaming materials now being commercially available. In order to perform this embedding operation, this foaming material is poured into can 11 with the can upside down, the catalyst is added, and the base assembly with the components supported thereon is inserted into can 11 before the foaming reaction takes place. The foaming material remains fluid until it obtains its maximum volume, at which time it converts into resilient cellular structure 40 completely surrounding but not exerting noticeable stresses upon the components within the can 11. After the embedding operation is complete, can 11 may be crimped to the sides of base member 10.

In order to permit quick and easy connection of control unit 9 in a suitable panel, base 10 is provided with a plurality of plug-in terminals or prongs 42 and 43 extending downwardly its bottom surface. In order to accommodate a great number of such terminals in the small base area of the unit 9, base 10 is provided with a central stem portion 45 of generally rectangular configuration extending along the entire width of the base 10 whereby the base has a T-shaped vertical cross-section. This rectangular stem portion 45 defines an internal rectangular cavity 46. The upper outer side portions 47 of base 10 each carry a row of outer prong terminals 42 depending therefrom, while the central stem portion 45 carries a row of central prong terminals 43 depending therefrom. By this arrangement the central stem portions insulates the row of prongs 42 on either side of the unit from one another and from the central row of prongs 43. In addition, this central stem portion 45 serves as a guide and a means for orienting the control unit within a correspondingly shaped socket (not shown) of a control panel. Such sockets form a portion of the subject matter of my co-pending U.S. patent application, entitled "Electric Control Panel," Serial No. 630,936, now Patent 2,916,721, issued December 8, 1959, and assigned to the present assignee. It will be noted that stem portion 45 includes an indented keyway 49 best seen in FIGURE 2 to aid in this orientation of the unit within a socket having a correspondingly located key projection.

Referring to FIGURE 3, the connections between the various components of unit 9 and to the terminals 42 and 43 are shown in circuit diagram form; corresponding components being designated by the same reference numerals. This circuit forms a portion of the subject matter of aforementioned U.S. patent application Serial No. 630,936 of Russell A. Brown.

In a typical "or" unit 9 of FIGURES 1, 2 and 3, rectifier 14 consists of a small germanium diode, resistor 15 has a resistance of 7500 ohms, capacitor 13 has a capacitance of 2 microfarads, core 16 consists of thin, flat laminations 3/8" wide stacked to a thickness of about 1/8". The windings 17–21 all consist of number 36 wire 0.005" diameter with the gate winding 17 having 1200 turns tapped to provide a feedback winding portion 17' of 200 turns, and each of the control windings 18–21 having 1000 turns. The signal currents supplied to the control windings are of the order of 0.005 ampere and the power pulses supplied to the power receiving terminals are approximately rectangular wave pulses having a voltage amplitude of 55 volts and a duration of 400 microseconds at a frequency of 120 pulses per second. In the operation of "or" unit 9, a signal current supplied to either control winding 19, 20, or 21 will cause the gate winding 17 to vary with great rapidity from a non-conducting condition to a conducting condition whereby a corresponding rapid change in output current level through an interconnected load impedance L occurs.

Figure 4:
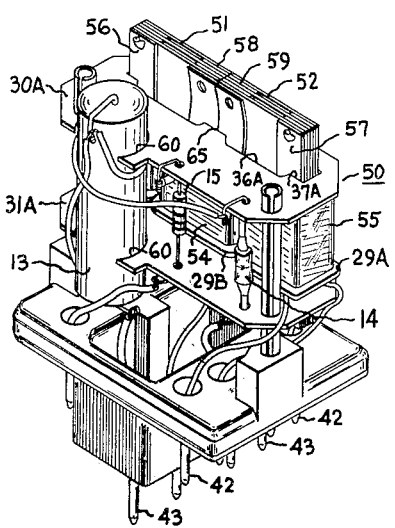
FIGURE 4 is a perspective view similar to that of FIGURE 1 showing a different static control unit embodying the invention.
Figure 5:
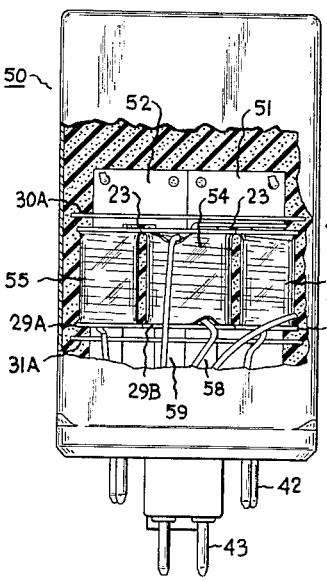
FIGURE 5 is a front view of the static control unit of FIGURE 4 with the housing in place and a portion broken away to show the interior of the unit.
Figure 6:
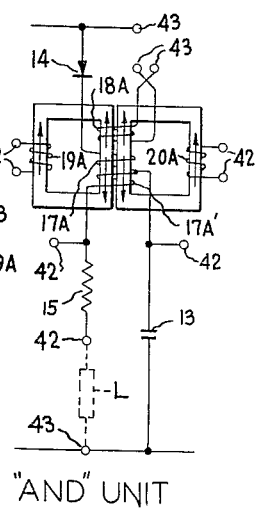
FIGURE 6 is a circuit diagram of the internal connections of the components of the control unit of FIGURE 4.

Referring now to FIGURES 4, 5 and 6 there is disclosed another static control unit 50, known as an "and" unit, embodying another form of the invention. It will be noted that many of the components of "and" unit 50 are similar to those of "or" unit 9 of FIGURES 1, 2 and 3, and similar components have been designated by the same reference numerals.

In "and" unit 50, however, two side-by-side cores 51 and 52 each smaller but similar in construction to core 16 are provided and three separate coil assemblies 53, 54 and 55 are employed. Coil assemblies 53 and 55 contain the control windings 19A and 20A and are wound on coil forms 29A loosely surrounding the outer legs 56 and 57 respectively of cores 51, 52, while the remaining coil assembly 54 contains the bias winding 18A and the tapped gate winding 17A and is wound on another coil form 29B loosely surrounding the two central legs 58, 59 of the two cores 51, 52. Non-magnetic plates 30A and 31A surround both cores 51 and 52 in planes above and below the three coil assemblies and each contains a side recess 60 for accommodating capacitor 13 which is mounted vertically between these plates along with rectifier 14 and resistor 15. Apertures 36A in plates 30A, 31A have a configuration providing confronting central shoulders 65 as well as confronting corner shoulders 37A, the distances between these confronting shoulders being slightly greater than the thickness of cores 51, 52 so as lightly to contact the cores. The remainder of the construction is substantially identical to that described in connection with "or" unit 9 of FIGURES 1, 2 and 3 except that the various components of unit 50 are connected in accord with the circuit diagram of FIGURE 6, this circuit forming a portion of the subject matter of the aforementioned U.S. patent application Serial No. 667,945 filed by Raymond E. Morgan and assigned to the present assignee.

In a typical "and" unit 50 of FIGURES 4, 5, and 6, cores 51 and 52 each consists of thin, flat laminations 3/8" wide stacked to a thickness of 1/8". The gate and control windings are of number 34 copper wire having a diameter of 0.0063" while the bias winding is of number 28 copper wire having a diameter of 0.0126". Bias winding 18A has 8 turns, control windings 19A and 20A each have 500 turns, gate winding 17A has 1100 turns tapped to provide a feedback winding portion 17A' of 200 turns. Capacitor 13, rectifier 14 and resistor 15 have the same values as in the "or" unit 9, and the unit may be driven from a same source of pulse power. A typical bias current for "and" unit 50 is 0.44 ampere. In the operation of "and" unit 50, signal currents must be supplied both to control winding 19A and 20A before the gate winding 17A becomes conductive to deliver an output current to an interconnected load impedance L.

Although I have described above only two embodiments of the invention, many modifications may be made and it is to be understood that I intend by the appended claim to cover all such modifications as fall within the true spirit and scope of the invention.

What I claim as new and desire to secure by Letters Patent of the United States is:

An insulating base adapted for plug-in connection to a socket, said base comprising a generally planar rectangular shaped base portion having a pair of parallel opposed side edges, a stem projecting in a first dimension from the central area of one side of said base portion having a generally rectangular cross section taken in a plane parallel to said base portion and having a cavity communicating with the opposite side of the base portion, said stem having a second dimension generally perpendicular to said side edges which extends substantially completely across said base portion and which is greater than said first dimension, said stem having an outer wall with a slot therein extending parallel to said first dimension to define a keyway, two sets of plug-in terminals carried by said base portion at opposite sides of said stem and extending from said base portion parallel to said first dimension, said two sets of terminals extending distances which are less than the distance of projection of said stem, and a third set of plug-in terminals carried by the stem and extending from its outer end parallel to said two sets of terminals, said cavity being adapted to receive conductors for connection to said third set of terminals.

References Cited in the file of this patent

UNITED STATES PATENTS

| | | |
|---|---|---|
| 1,955,418 | Folen | Apr. 17, 1934 |
| 2,220,158 | Kohler | Nov. 5, 1940 |
| 2,421,155 | Miller | May 27, 1947 |
| 2,452,157 | Sears | Oct. 26, 1948 |
| 2,617,090 | Ogle | Nov. 4, 1952 |
| 2,637,763 | Palmer | May 5, 1953 |
| 2,683,766 | Cunningham | July 13, 1954 |
| 2,688,123 | Benham | Aug. 31, 1954 |
| 2,765,119 | Marvin | Oct. 2, 1956 |
| 2,790,948 | Wennerberg | Apr. 30, 1957 |
| 2,802,185 | Dewitz | Aug. 6, 1957 |
| 2,814,786 | Naul | Nov. 26, 1957 |

FOREIGN PATENTS

| | | |
|---|---|---|
| 826,176 | Germany | July 8, 1949 |
| 743,490 | Great Britain | Jan. 18, 1956 |